United States Patent
Goyal et al.

(10) Patent No.: US 10,708,233 B2
(45) Date of Patent: Jul. 7, 2020

(54) IDENTIFICATION OF CERTIFICATE PINNED MOBILE APPLICATIONS IN CLOUD BASED SECURITY SYSTEMS

(71) Applicant: Zscaler, Inc., San Jose, CA (US)

(72) Inventors: Rohit Goyal, Malout (IN); Abhinav Bansal, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 225 days.

(21) Appl. No.: 15/605,128

(22) Filed: May 25, 2017

(65) Prior Publication Data

US 2018/0288062 A1 Oct. 4, 2018

(30) Foreign Application Priority Data

Mar. 30, 2017 (IN) .............................. 201711011437

(51) Int. Cl.
*H04L 29/06* (2006.01)
*H04W 12/12* (2009.01)
*H04L 29/08* (2006.01)

(52) U.S. Cl.
CPC ...... *H04L 63/0281* (2013.01); *H04L 63/0464* (2013.01); *H04L 63/1408* (2013.01); *H04L 67/10* (2013.01); *H04W 12/12* (2013.01); *H04L 63/0823* (2013.01); *H04L 63/166* (2013.01)

(58) Field of Classification Search
None
See application file for complete search history.

(56) References Cited

U.S. PATENT DOCUMENTS

| 9,602,291 | B2 * | 3/2017 | Ashley | H04L 63/0823 |
| 2003/0028606 | A1 * | 2/2003 | Koopmans | H04L 51/066 |
| | | | | 709/206 |
| 2003/0053448 | A1 * | 3/2003 | Craig | H04L 67/2814 |
| | | | | 370/353 |
| 2004/0210674 | A1 * | 10/2004 | Gbadegesin | H04L 29/06 |
| | | | | 709/249 |
| 2005/0144328 | A1 * | 6/2005 | McBeath | H04L 12/46 |
| | | | | 709/251 |
| 2006/0031407 | A1 * | 2/2006 | Dispensa | H04L 29/12009 |
| | | | | 709/219 |
| 2010/0024026 | A1 * | 1/2010 | Ylonen | H04L 12/4604 |
| | | | | 726/12 |

(Continued)

OTHER PUBLICATIONS

Griffith, Eric, "What is Cloud Computing?", May 3, 2016, www.PCMag.com, p. 1-8. (Year: 2016).*

*Primary Examiner* — Jeffery L Williams
(74) *Attorney, Agent, or Firm* — Clements Bernard Walker; Lawrence A. Baratta, Jr.

(57) ABSTRACT

Systems and methods of identifying and processing certificate pinned applications through a cloud based security system include monitoring traffic associated with a connection; developing a profile of an application associated with the traffic based on the monitoring, wherein the profile comprises whether or not the application is a certificate pinned application which requires a predefined set of criterion to be matched against an advertised certificate; and selectively performing SSL interception of the connection in the cloud based security system based on the profile. The monitoring can include monitoring handshake messages between a client and a server to determine a handshake status and a certificate status.

15 Claims, 5 Drawing Sheets

(56) References Cited

U.S. PATENT DOCUMENTS

| | | | |
|---|---|---|---|
| 2010/0318665 A1* | 12/2010 | Demmer | H04L 41/12 709/227 |
| 2014/0325087 A1* | 10/2014 | Barreto | H04L 49/90 709/231 |
| 2015/0143504 A1* | 5/2015 | Desai | H04L 45/14 726/13 |
| 2016/0149898 A1* | 5/2016 | Parla | H04L 63/0815 726/6 |
| 2016/0234104 A1* | 8/2016 | Hoffmann | H04L 41/0806 |
| 2016/0248812 A1* | 8/2016 | Desai | H04L 45/14 |
| 2017/0064749 A1* | 3/2017 | Jain | H04L 12/4641 |
| 2017/0078328 A1* | 3/2017 | McGinnity | H04L 9/3263 |
| 2017/0142068 A1* | 5/2017 | Devarajan | H04L 43/028 |
| 2017/0325113 A1* | 11/2017 | Markopoulou | H04L 12/4641 |
| 2017/0346853 A1* | 11/2017 | Wyatt | H04L 43/12 |
| 2018/0063077 A1* | 3/2018 | Tumuluru | H04L 61/2592 |
| 2018/0181431 A1* | 6/2018 | Vincent | H04L 12/4633 |
| 2018/0288062 A1* | 10/2018 | Goyal | H04L 63/0281 |
| 2019/0238592 A1* | 8/2019 | Qureshi | G06F 21/6209 |

* cited by examiner

IDENTIFICATION OF CERTIFICATE PINNED MOBILE APPLICATIONS IN CLOUD BASED SECURITY SYSTEMS

FIELD OF THE DISCLOSURE

The present disclosure generally relates to networking systems and methods. More particularly, the present disclosure relates to systems and methods for identification of certificate pinned mobile applications in cloud based security systems allowing Secure Socket Layer (SSL) interception selectively.

BACKGROUND OF THE DISCLOSURE

There has been a staggering growth of mobile applications ("apps," also referred to herein as client apps, mobile client apps, etc.) in the enterprise networking landscape (and everywhere). Most of these mobile apps are designed to communicate with dedicated servers that makes them agnostic of the network path and network devices which in their communication journey. Secure Socket Layer (SSL) is the most widely used protocol by such apps to ensure a degree of security over the otherwise insecure channel. The SSL protocol uses public key cryptography to authenticate the identity of the communicating parties. The security model to achieve this usually relies on a set of trusted Certificate Authorities (CAs) that makes these communications vulnerable to weaknesses in CAs.

The mobile client apps only accept public key server certificates that are signed by a trusted CA. To make this requirement more stringent, certain apps require the server provided certificates to match predefined criterion, referred to as certificate pinning. This is done to ensure greater control over the communicating entities and to prevent the Man in the Middle (MITM) attacks. The situation is somewhat of a paradox: entities such as Domain Name Systems (DNS) and CAs are trusted and supposed to supply trusted input. However, more and more applications are trying hard with pinning to eliminate this conference of trust. By pinning the certificate or the public key of the server certificate, an application no longer needs to depend on third party entities such as DNS, CA, etc. when making security decisions relating to a peer's identity. This makes an app immune to MITM attacks. Pinning effectively removes the "conference of trust" by eliminating the set of entities that are beyond the control of a domain owner. Mobile apps achieve this by accepting server certificates that strictly match a defined criterion, usually subject key information.

While this does solve some security concerns that app developers may have; however, it engenders some serious challenges to enterprise security. These mobile apps inevitably fail in network stringent enterprise environments that are heavily militarized using firewalls, packet filters, proxies, and network access controls. The enterprise security measures impose several constraints on the network traffic that often disrupts mobile application communication channel. With attacks vector utilizing more and more encrypted channels to deliver malicious programs and compromise user devices, many enterprises deploy filtering solutions as a strategy to combat data loss prevention.

One of the major security measures employed by the enterprises is an interception proxy, e.g., the Secure Socket Layer (SSL) interception proxy. The proxy servers employed in enterprise security systems are aware of the SSL encrypted communication and may need to intercept it in order to provide security services. Such filtering solutions are generally achieved through interception proxies that engage in deep packet inspection to resist SSL-based threats that may range from trivial viruses to sophisticated ransomware. The problem when mobile apps employ certificate pinning is that they reject the connection during negotiation with an interception proxy on account of peer's (in this case SSL proxy) untrusted certificate.

Such apps fail to function in the enterprise environment and fail to provide desired services leading to bad user experience and frustration. The apps would be rendered dysfunctional partially or completely due to the certificate pinning employed by them. They will terminate the connection upon receiving a server certificate from the proxy that does not match the criterion. This leads to a bad user experience and the cloud security system does not have any visibility or resolution of such issues.

As more and more viruses use encrypted channels to infect machines, it is imperative for enterprises to employ SSL interception proxies to protect users. This poses a conundrum as app developers would like to eliminate trust on third parties like CAs which may be vulnerable to other attacks. To solve this issue, an Information Technology (IT) admin may be lured to turn SSL interception off which makes their enterprise security even worse. Hence, it is desirable for IT admins to selectively turn SSL interception off only for some trusted applications and domains. Since it is very hard for IT admins to know apriori which apps users will use or what domains the app may hit which may even change over time, there is a huge need for a better tunneling solution.

The cloud security systems that intercept the traffic from endpoint devices in order to provide security and compliance services have little or no idea about the dysfunctional client apps. The client apps terminate the connection with or without an alert message to the server upon receiving the mismatched certificate. Further, the IT admin has no way to find all the apps and their server domains for which the app performs pinning. As a result, this design does not allow the users to use such apps while subscribing to the security or enterprise compliance policies. In order to make these apps functional again, the cloud systems need to identify the certificate pinned hosts and add them to some bypass list for SSL interception. This process is not only difficult but also requires manual intervention from the IT admin to identify a list of trusted domains for which the enterprise is willing to forgo SSL interception.

BRIEF SUMMARY OF THE DISCLOSURE

In an exemplary embodiment, a method of identifying and processing certificate pinned applications through a cloud security system includes monitoring traffic associated with a connection; developing a profile of an application associated with the traffic based on the monitoring, wherein the profile includes whether or not the application is a certificate pinned application which requires a predefined set of criterion to be matched against an advertised certificate; and selectively performing interception of the connection in the cloud system based on the profile. The monitoring can include monitoring handshake messages between a client and a server to determine a handshake status and a certificate status. The monitoring can be performed through a tunnel installed on a client which passively observes handshake messages between the client and a server. The client can be configured to perform steps of inspecting packets from the tunnel, mangling the packets, and injecting the packets back into a kernel. The monitoring can be performed by a client and the profile developing can be performed by the cloud system subsequent to receiving information related to the monitoring from the client. The monitoring can be performed through a tunnel installed on a client which passively observes handshake messages between the client and a server, the profile developing can be performed by the client, and the method can further include transmitting the profile to the cloud system. The selectively performing interception is not performed responsive to the profile indicating an application is a certificate pinned application. The method can further include, for a certificate pinned application, performing one of allowing the connection, blocking the connection, and quarantining the connection through the cloud system.

In another exemplary embodiment, a user device configured to operate a context aware tunnel to identify and process certificate pinned applications with a cloud system includes a network interface; a processor communicatively coupled to the network interface; and memory storing instructions that, when executed, cause the processor to: monitor traffic associated with a connection; develop a profile of an application associated with the traffic based on the monitoring, wherein the profile includes whether or not the application is a certificate pinned application which requires a predefined set of criterion to be matched against an advertised certificate; and provide the profile to the cloud system for selective interception of the connection in the cloud system based on the profile. To monitor the traffic, the memory storing instructions that, when executed, can further cause the processor to monitor handshake messages between the user device and a server to determine a handshake status and a certificate status. To monitor the traffic, the memory storing instructions that, when executed, can further cause the processor to operate a tunnel installed on the user device which passively observes handshake messages between the user device and a server. The memory storing instructions that, when executed, can further cause the processor to inspect packets from the tunnel, mangle the packets, and inject the packets back into a kernel. The cloud system does not perform the selective interception responsive to the profile indicating an application is a certificate pinned application. The cloud system can be configured to, for a certificate pinned application, perform one of allow the connection, block the connection, and quarantine the connection.

In a further exemplary embodiment, an interception proxy in a cloud system configured to identify and process certificate pinned applications includes a network interface; a processor communicatively coupled to the network interface; and memory storing instructions that, when executed, cause the processor to: maintain a profile of a plurality of applications, wherein the profile includes whether or not the application is a certificate pinned application which requires a predefined set of criterion to be matched against an advertised certificate, and wherein the profile is developed based on monitoring traffic associated with a connection associated with an application; and selectively perform interception of connections in the cloud system based on the associated profile of the associated application. The profile can be developed by monitoring handshake messages between a client and a server to determine a handshake status and a certificate status. The profile can be developed through a tunnel installed on a client which passively observes handshake messages between the client and a server. The interception proxy can be part of a cloud system which is communicatively coupled to a client associated with the associated application via a tunnel. The selectively interception can be not performed responsive to the profile indicating an application is a certificate pinned application. The memory storing instructions that, when executed, can further cause the processor to, for a certificate pinned application, perform one of allow the connection, block the connection, and quarantine the connection through a cloud system.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a mobile device, which may be used in the cloud-based system of FIG. 1 or the like;

DETAILED DESCRIPTION OF THE DISCLOSURE

Again, in various exemplary embodiments, the present disclosure relates to systems and methods for identification of certificate pinned mobile applications in cloud based systems allowing Secure Socket Layer (SSL) interception selectively. Specifically, a context aware tunneling protocol coupled with cloud security system to solves the aforementioned problems of SSL certificate pinning. The tunnel receives the traffic from client apps and forwards it to the cloud security system. The tunnel receives IP (Internet Protocol) packets from the client app and passively observes the SSL record layers for encrypted communications. These headers provide information about the SSL handshake messages exchanged. The tunnel thus has visibility if the client apps terminate the connection after receiving server certificate. The information about the client app, hostnames, and the SSL handshake headers constitute an SSL profile that can be used for further decision making, such as whether or not SSL interception can be performed. Accordingly, a cloud based security system can have clear visibility of which apps do not work with SSL interception. IT administrators can select a policy for apps which use certificate pinning and decide to ALLOW, BLOCK, or QUARANTINE transactions from such applications. A further benefit includes visibility of the apps that users are operating. This visibility can be used to detect suspicious activities, potential malware application distribution across the enterprise, etc. For certificate pinned apps, the context aware tunneling can automate bypassing such pinned hosts and processes, leading to better user experience and productivity.

Exemplary Cloud System Architecture

Figure 1:
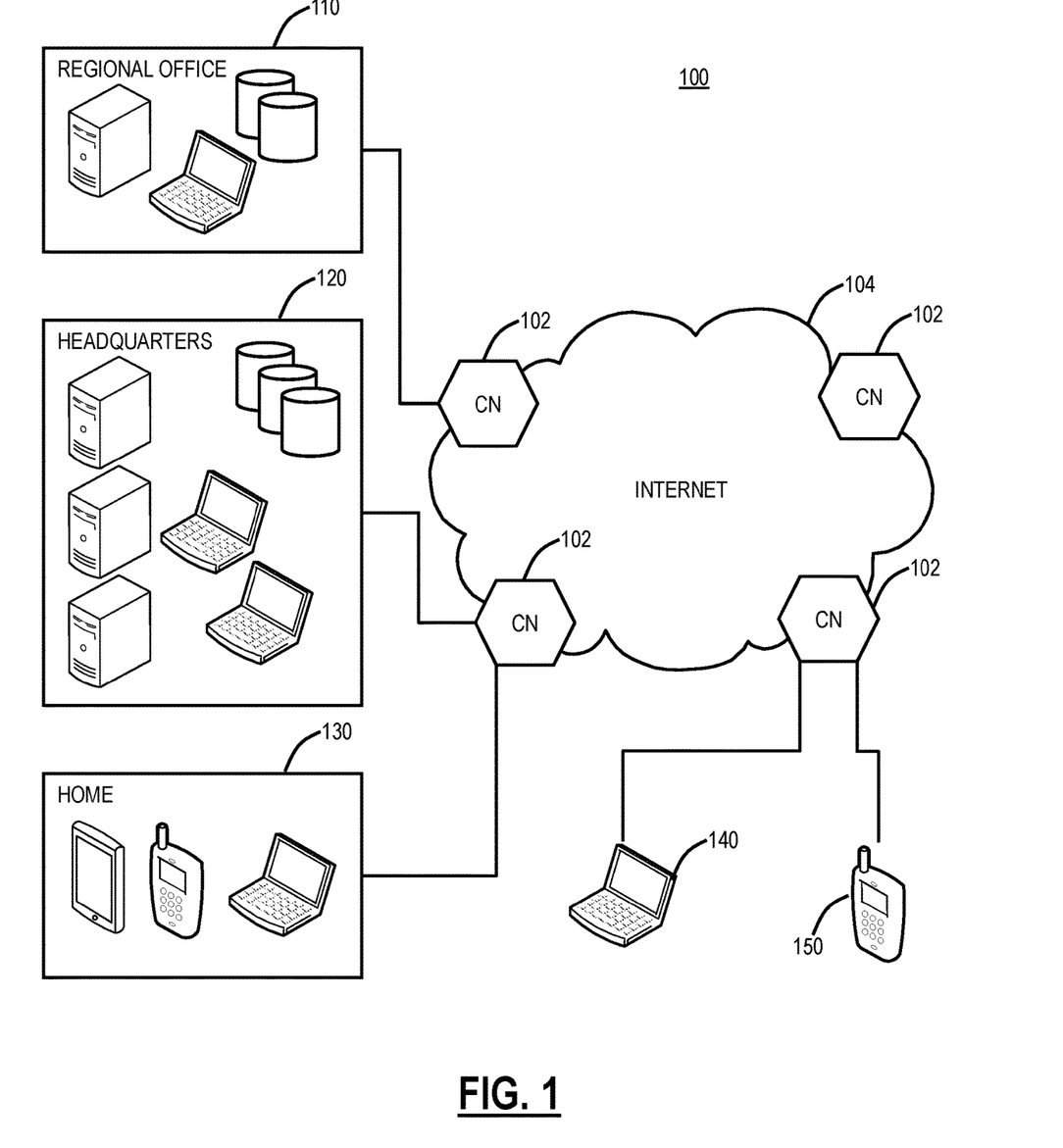
FIG. 1 is a network diagram of a cloud-based system for implementing various cloud-based service functions.
Figure 2:
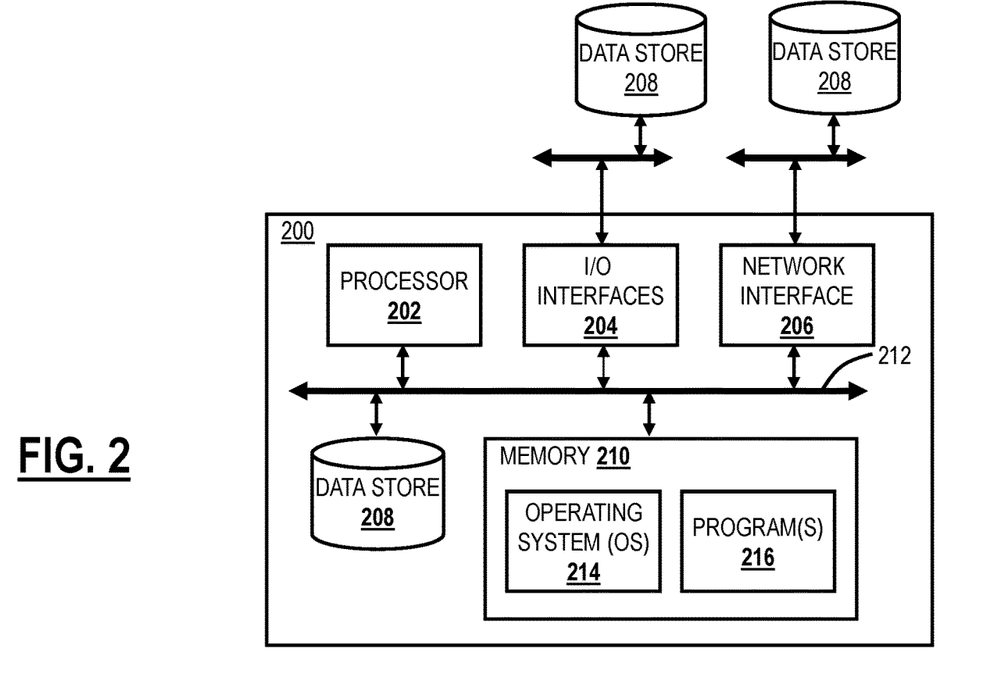
FIG. 2 is a block diagram of a server which may be used in the cloud-based system of FIG. 1, in other systems, or standalone.

Referring to FIG. 1, in an exemplary embodiment, a network diagram illustrates a cloud-based system 100 for implementing various cloud-based service functions. The cloud-based system system 100 includes one or more cloud nodes (CN) 102 communicatively coupled to the Internet 104 or the like. The cloud nodes 102 may be implemented as a server 200 (as illustrated in FIG. 2), or the like, and can be geographically diverse from one another such as located at various data centers around the country or globe. For illustration purposes, the cloud-based system 100 can include a regional office 110, headquarters 120, various employee's homes 130, laptops/desktops 140, and mobile devices 150 each of which can be communicatively coupled to one of the cloud nodes 102. These locations 110, 120, 130 and devices 140, 150 are shown for illustrative purposes, and those skilled in the art will recognize there are various access scenarios to the cloud-based system 100 all of which are contemplated herein.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

Two exemplary services include Zscaler Internet Access (which can generally be referred to as Internet Access (IA)) and Zscaler Private Access (which can generally be referred to as Private Access (PA)), from Zscaler, Inc. (the assignee of the present application). The IA service can include firewall, threat prevention, Deep Packet Inspection (DPI), Data Leakage Prevention (DLP), and the like. The PA can include access control, micro service segmentation, etc. For example, the IA service can provide a user with Internet Access and the PA service can provide a user with access to enterprise resources in lieu of traditional Virtual Private Networks (VPNs).

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one exemplary embodiment of a cloud-based system, and those of ordinary skill in the art will recognize the systems and methods described herein contemplate operation with any cloud-based system.

In an exemplary embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, bandwidth control, DLP, zero-day vulnerability protection, web 2.0 features, and the like. In an exemplary embodiment, the cloud-based system 100 may be viewed as Security-as-a-Service through the cloud, such as the IA.

Figure 3:
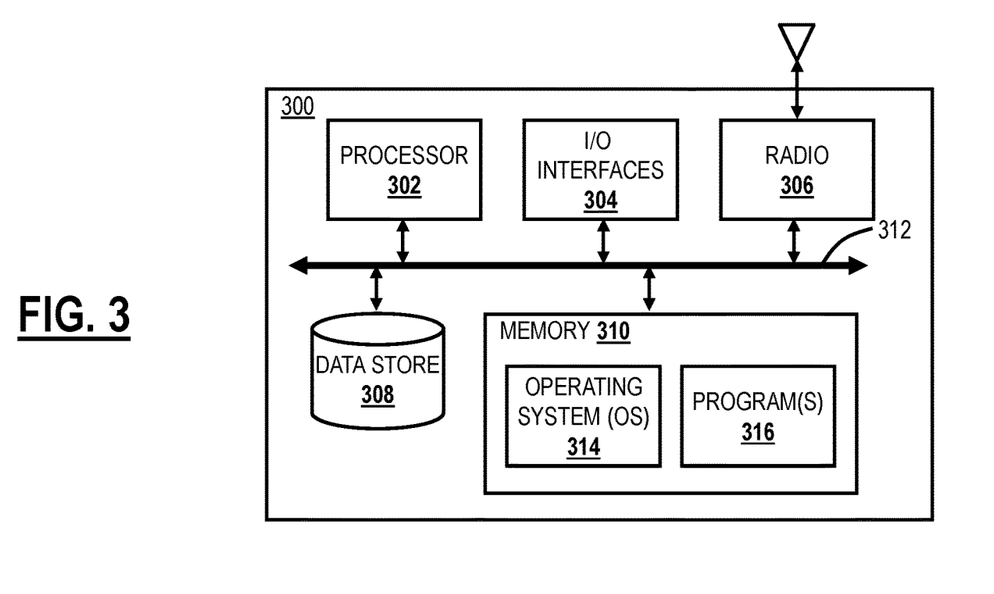

In an exemplary embodiment, the cloud-based system 100 can be configured to provide mobile device security and policy systems and methods. The mobile device 150 may be a mobile device 200 (as illustrated in FIG. 3) and may include common devices such as laptops, smartphones, tablets, netbooks, personal digital assistants, MP3 players, cell phones, e-book readers, and the like. The cloud-based system 100 is configured to provide security and policy enforcement for devices including the mobile devices 150 in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, geographical distribution of the cloud nodes 102, policy shadowing of users which is dynamically available at the cloud nodes 102, etc.

Exemplary Server Architecture

Referring to FIG. 2, in an exemplary embodiment, a block diagram illustrates a server 200 which may be used in the cloud-based system 100, in other systems, or standalone. For example, the cloud nodes 102 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Referring to FIG. 3, in an exemplary embodiment, a block diagram illustrates a mobile device 300, which may be used in the cloud-based system 100 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e. camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network such as the cloud-based system 100.

SSL Handshake Process

Figure 4:
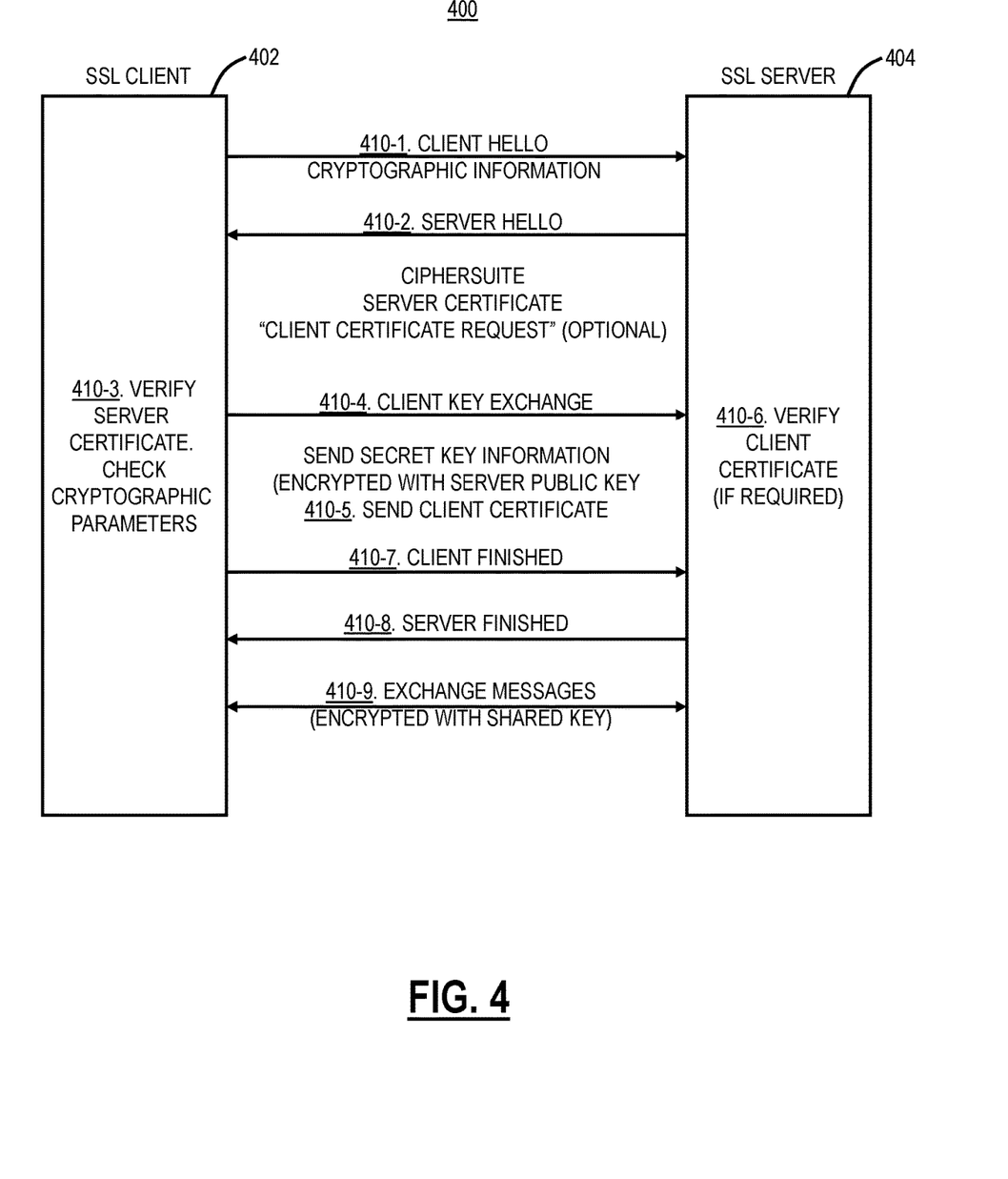
FIG. 4 is a diagram of an SSL handshake process between an SSL client and an SSL server.

Referring to FIG. 4, in an exemplary embodiment, a diagram illustrates an SSL handshake process 400 between an SSL client 402 and an SSL server 404. The SSL client 402 can be one of the devices 140, 150, the mobile device 300, etc. and the SSL server 404 can be a location on the Internet 104. The SSL client 402 sends a "client hello" message that lists cryptographic information such as the SSL version and, in the client's order of preference, the CipherSuites supported by the SSL client 402 (step 410-1). The message also contains a random byte string that is used in subsequent computations. The protocol allows for the "client hello" to include the data compression methods supported by the SSL client 402.

The SSL server 404 responds with a "server hello" message that contains the CipherSuite chosen by the SSL server 404 from the list provided by the SSL client 402, the session ID, and another random byte string (step 410-2). The SSL server 404 also sends its digital certificate. If the SSL server 404 requires a digital certificate for client authentication, the SSL server 404 sends a "client certificate request" that includes a list of the types of certificates supported and the Distinguished Names of acceptable CAs. The SSL client 402 verifies the SSL server's 404 digital certificate (step 410-3).

The SSL client 402 sends the random byte string that enables both the SSL client 402 and the SSL server 404 to compute the secret key to be used for encrypting subsequent message data (step 410-4). The random byte string itself is encrypted with the SSL server's 404 public key. If the SSL server 404 sent a "client certificate request," the SSL client 402 sends a random byte string encrypted with the client's private key, together with the SSL client's 402 digital certificate, or a "no digital certificate alert" (step 410-5). This alert is only a warning, but with some implementations, the handshake fails if client authentication is mandatory. The SSL server 404 verifies the client's certificate if required (step 410-6).

The SSL client 402 sends the server a "finished" message, which is encrypted with the secret key, indicating that the SSL client 402 part of the handshake is complete (step 410-7). The SSL server 404 sends the SSL client 402 a "finished" message, which is encrypted with the secret key, indicating that the SSL server 404 part of the handshake is complete. For the duration of the SSL session, the SSL server 404 and SSL client 402 can now exchange messages that are symmetrically encrypted with the shared secret key (step 410-9).

SSL Interception Proxies

Figure 5:
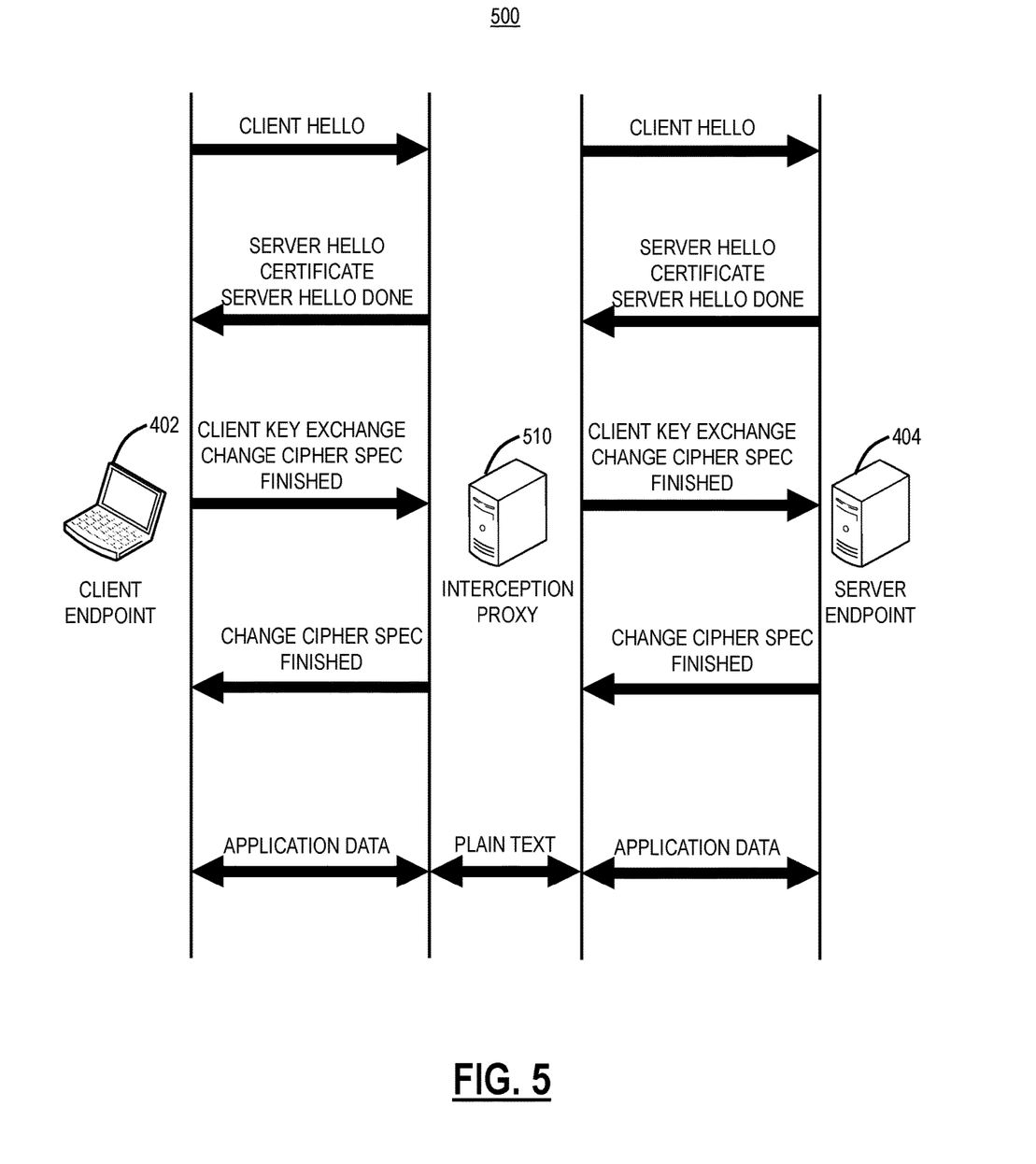
FIG. 5 is a diagram of a network performing SSL interception in the handshake process.

Referring to FIG. 5, in an exemplary embodiment, a diagram illustrates a network 500 performing SSL interception through an interception proxy 510 in the handshake process 400. The interception proxy 510 can be the cloud node 102, the server 200 on the Internet 104, etc. Enterprises deploy the interception proxy 510 to secure themselves from SSL based threats which are increasingly common. The interception proxy 510 works by acting as a man-in-the-middle and modifying the encrypted channel. Whenever the SSL client 402 initiates a connection to a remote SSL server 404, the interception proxy 510 will intercept it and open two different channels of communication, one with the SSL client 402 and the other with the SSL server 404 that the SSL client 402 intended to talk to in the first place. This allows the interception proxy 510 to actively modify/inject the content from the SSL client 402 to the SSL server 404 or vice versa. This allows IT admins to perform malware scanning and the like on the otherwise encrypted content. In order to achieve this, an IT admin usually deploys proxy's ROOT CA certificate on end user devices for the SSL clients 402 to trust the handshake which happens between the SSL client 402 and the interception proxy 510 which generates a certificate for every SSL server 404 that the SSL client 402 tries to communicate with. This naturally breaks with apps that employ certificate pinning for enhanced security.

Advantageously, the interception proxy 510 enables interception, inspection, and filtering of content on an otherwise encrypted channel. For example, the cloud system 100 using the interception proxy 510 can perform Data Leakage Prevention (DLP), web content filtering, malware detection, intrusion detection/prevention, firewall and Deep Packet Inspection (DPI), etc. The interception proxy 510 acts as the SSL client 402 on the SSL server 404 side and as the SSL server 404 on the SSL client 402 sides.

Certificate Pinning

In SSL communication, the SSL server 404 identity is verified by the SSL client 402 through a public key certificate signed by a trusted CA or a chain of trusted CAs. Since this conference of trust is vulnerable, an SSL client 402 may take extra steps to establish the trust. Certificate pinning is a mechanism to provide an additional level of security in an insecure environment by associating a host with its expected public key. The SSL clients 402 which use pinning keep a set of predefined criterion (called pin) to be matched against the advertised certificate. Only the certificates that match the criterion are accepted by the SSL client 402 for further communication. This ensures that the SSL client 402 exchanges data only with the SSL server 404 that provides a specific certificate. The SSL client 402 may choose to (1) pin the certificate, or (2) pin the public key.

The pin can be added to the client app during development phase or when the app first receives the certificate from the SSL server 404. The former is a better approach since the pin is loaded into the app out of the band, i.e., it does not need to be exchanged on the insecure channel itself that may lead to problems associated with Trust-on-first-use. The requirements which can range from specifying a particular CA or the entire X509 certificate can be added to the pinset of the client app during development.

Context Aware Tunneling

Figure 6:
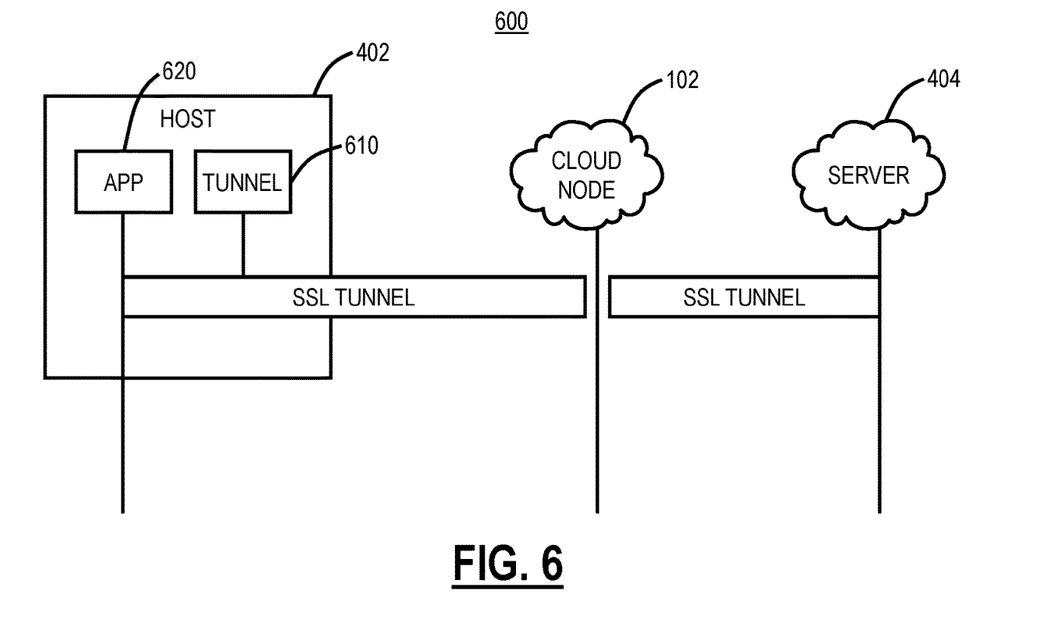
FIG. 6 is a network diagram of a network with a context aware tunnel.

Referring to FIG. 6, in an exemplary embodiment, a network diagram illustrates a network 600 with a context aware tunnel 610. In various exemplary embodiment, the systems and methods include the context aware tunnel 610 in the cloud system 100 which identifies certificate pinning in addition to providing communication between the SSL client 402 and the cloud node 102. As such, an interception proxy 510 in the cloud system 100 can selectively intercept SSL communications where there is no certificate pinning and block/allow/quarantine SSL communications with certificate pinning. The context aware tunnel 610 can use context aware tunneling protocol described herein. The traffic is forwarded from the SSL clients 402 to the cloud system 102 using the context aware tunnel 610.

In an exemplary embodiment, Internet-bound traffic of the mobile device 300 (the SSL client 402) is controlled through the tunnel 610 to the cloud system 100. The tunnel 610 acts as an intermediary passive man-in-the-middle proxy that relays all the network requests and responses from client applications 620 to the cloud system 100. To achieve this, a process running on the host (the SSL client 402) installs a virtual interface on the mobile device 300. The process installs a default route on the interface in the device routing table and opens listening sockets for User Datagram Protocol (UDP) and Transmission Control Protocol (TCP) traffic at randomly available ports.

The SSL client 402 is configured to operate the context aware tunnel 610 and one or more apps 620. The present disclosure uses the context aware tunnel 610 to identify the hosts (SSL servers 404) and processes that pin server certificates. The tunnel 610 receives the traffic from client apps 620 and forwards it to the physical interface after processing/split tunneling. The context aware tunnel 610 can be the virtual tunnel adapter that receives TCP packets from the client app 620, the tunnel 610 parses the SSL headers in the case of SSL communications. For every SSL request initiated by the client app 620, the tunnel connection object parses the SSL handshake headers to keep a record of the messages exchanged between the SSL client 402 and the SSL server 404. The connection object also retrieves the process identifier for the traffic coming from a specific client port. Thus, the object now has the SNI (Server Name Indication) hostname, the associated process identifier and the sequence of SSL handshake messages exchanged in the communication.

With this information, the tunnel 610 can be used to detect pinned certificates. For the purpose of detecting pinned certificates, the following messages are significant 1) Client Hello: sent by the SSL client 402 to start SSL handshake with associated host, 2) Server Certificate: sent by the SSL server 404 containing the identifying certificates, 3) SSL Alert: sent by the SSL client 402 to alert an error to the SSL server 404, and 4) Application Data: initiated by the SSL client 402 signifying the successful handshake.

For every transaction, the tunnel 610 monitors the behavior of the client app 620 after a response has been relayed to the SSL client 402 from the cloud system 100. For instance, in the case of certificate pinning, the SSL client 402 will close the connection after the SSL server 404 sends its certificate. The tunnel protocol will record this transaction and mark the SSL server 404 and the process as a pinned entity. Note that the tunnel 610 is just passively observing data flow and is not actively modifying any content. This information can be periodically sent to a cloud system 100 from the tunnel 610 operating on the SSL client 402 for an IT admin to apply policies on such network traffic. In further transactions from the same application 610, the tunnel will send a bit flag to the cloud security system to notify the pinned nature of the transaction. Depending upon the enterprise trust policy on pinned domains, the cloud system 100 will abandon SSL interception for the domain in consideration that will allow the client application 610 to function smoothly.

For every packet coming on the interface, the tunnel 610 inspects, mangles the packet, and injects it back into the kernel. The mangling of the packet is done by swapping the IP packet source and destination addresses and replacing the destination port to one of the listening ports based on the context aware tunneling protocol. For a packet mangling example, assume x.x.x.x is IP address of tunnel interface, and zz is the local listening socket port. For every packet that comes on the listening socket of the tunnel 610, it creates a new outbound socket to the cloud node 102 in the cloud system 100. The response from the cloud node 102 is relayed back to the client socket after reverse mangling the packet. This is illustrated in the following table:

| Original Packet | Modified Packet |
| --- | --- |
| Request packet from client app: Src: x.x.x.x:xx Dest: y.y.y.y:yy | Src: y.y.y.y:xx Dest: .x.x.xx:zz Entry added to mapping table: <xx, yy> |
| Response packet from listening socket: Src: x.x.x.x:zz Dest: y.y.y.y:xx | Entry fetched from mapping table for key: xx is yy Src: y.y.y.y:yy Dest: x.x.x.x:xx |

SSL Profile Construction, Learning and Transfer of Knowledge

In an SSL interception environment, for every new TCP connection, the tunnel 610 process on the device creates a state machine for the transaction and, based on the results of the transaction, the process constructs an SSL profile for the SSL client 402 which initiated the connection. For every connection, the process can construct an SSL profile for the connection as a tuple: <Origin, Host-Name, Destination-Socket-Address, Handshake-Status, Pinning-Status>.

The Origin is the client application 620 which is originating a request. The origin information is obtained through a process to port mapping on the host machine. The Host Name is the fully qualified domain name of the SSL server 404 that the SSL client 402 is trying to reach. The hostname is retrieved from the SNI (Server Name Indication) parsed as a TLS extension in the Client Hello SSL record. The Destination Socket contains information about Destination-Server-IP-Address:Destination-Port that the SSL client 402 is trying to establish a connection. This information is retrieved by parsing IP-packet header during connection establishment.

Figure 7:
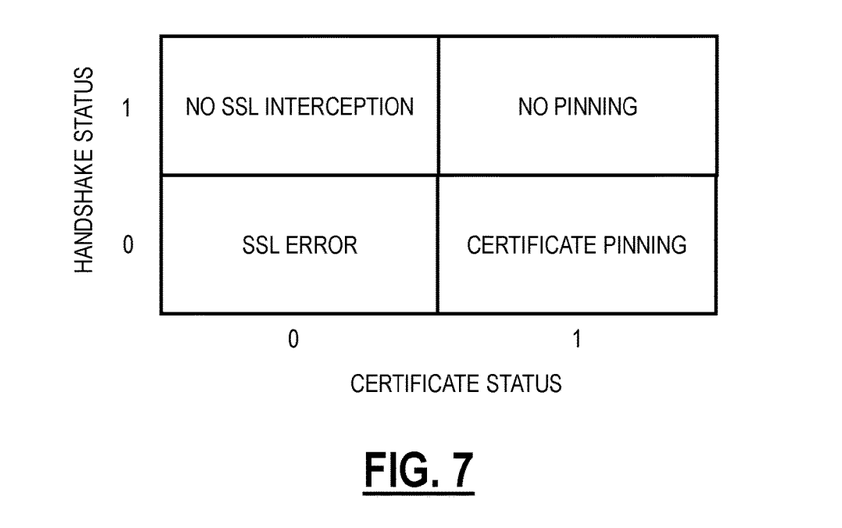
FIG. 7 is a table of an exemplary embodiment of different possible states given the Handshake Status and the Certificate Status.

The Handshake Status is a bit flag which keeps a record of SSL handshake messages exchanged with the SSL server 404. The flag is set to 1 if the handshake succeeds and the client starts sending Application Data to the server. The Certificate Status is a bit flag which keeps a record whether SSL interception for the transaction was on or off. The flag is set if the CA certificate in the SSL Record Layer matches the certificate of the SSL interception proxy 510. FIG. 7 is a table of an exemplary embodiment of different possible outcomes given the Handshake Status and the Certificate Status.

The profile is learned for every transaction and reevaluated whenever the SSL client 402 tries to reach the same destination. This knowledge is periodically transferred to the cloud system 100 out-of-band on a persistent control channel that allows the cloud system 100 to learn the behavior of client apps 620 with SSL interception. Based on the values of Certificate and Handshake Status, the cloud system 620 can identify apps that perform SSL pinning.

In order to construct this profile, the process passively observes the SSL Record Layer data messages and keep track of all the records that have been exchanged for any given transaction. For example, the process can parse the SSL headers to check if the SSL client 402 returns an SSL alert and/or if application data is sent over the connection. The process can parse the initial (K) server bytes and check the intermediate CA certificate from the cloud node 102. The process can find the processes and host corresponding to the connection.

The following SSL handshake messages can be recorded:

Client hello to determine the SSL server 404 the SSL client 402 wants to connect with. The SNI host field provides the information.

Server Hello to determine the server response towards the client request and client supported ciphers.

Certificate which contains the certificates advertised by the SSL server 404 and which is used to check if SSL interception is enabled for the transaction.

Alert (optional) which indicates if the SSL client 402 rejected the certificate and the reason for rejection.

Application data which indicates the successful handshake since the application data is exchanged now.

These SSL handshake messages provide the information for detecting the pinned transactions and the flow of the SSL handshake. This process can be extended to generate more detailed profiles containing the ciphers supported by the SSL client 402 and the SSL server 404, SSL version, certificate chain, etc.

Every SSL message is sent as part of the Record Layer Protocol which provides messages in the following format:

| Content type (1 Octet) | Version (2 Octets) | Length (2 Octets) | Data |
| --- | --- | --- | --- |

The tunnel process will parse the data that may be segmented across multiple TCP Payloads to construct the profile for the transaction.

With the proliferation of mobile applications 620 in stringent network enterprises, it is imperative for enterprise networking solutions to adapt to mobile applications network traffic so that the users can securely access the mobile applications 620 without getting lost in the network errors due to certificate pinning. Using the context aware secure tunneling approach to the cloud system 100, the IT admins can secure the enterprise from SSL based threats as well provide a better user experience without hampering their productivity.

The present disclosure aims to exemplify such a tunneling system which provides following advantages. First, the tunnel 610 provides visibility of dysfunctional apps; the cloud system 100 has a clear visibility of the apps 620 that do not work with an interception. The information received from the client tunnel 610 service indicates the apps 620, their associated hosts and the TLS handshake headers exchanged between the app 620 and the SSL server 404 before the connection was closed. This can be used to build a profile of the apps 620 at the cloud back end in the cloud system 100.

Second, for policy enforcement, an IT admin can select a policy for applications 620 which employ certificate pinning and decide to ALLOW/BLOCK/QUARANTINE transactions from such an application 620. This provides a more controlled environment for enterprises. Third, the tunnel 610 allows automation of TLS bypass. The context aware tunneling automates bypassing such pinned hosts and processes. In an otherwise manual process of identifying the apps 620 and hosts that do not work with TLS interception, this design enhances the user experience and productivity.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of identifying and processing certificate pinned applications through a cloud based security system, the method comprising:
    passively monitoring, with a tunnel installed on a client, an application installed on the client and traffic associated with a connection through the tunnel including passively observing handshake messages for establishing a connection to a server, between the client and one of the server and the cloud based security system, wherein the tunnel provides communication between the client and the cloud based security system;
    determining, based at least in part on a behavior of the application, a handshake status and a certificate status of the application;
    developing a profile of the application associated with the traffic based on the handshake status and the certificate status of the application, wherein the profile comprises whether or not the application is a certificate pinned application which requires a predefined set of criterion to be matched against an advertised certificate;
    selectively performing interception of the connection in the cloud based security system based on the profile; and
    transfering the profile periodically to the cloud based security system on an out-of-band, persistent, control channel.

2. The method of claim 1, wherein the monitoring is performed by a client and the profile developing is performed by the cloud based security system subsequent to receiving information related to the monitoring from the client.

3. The method of claim 1, wherein the profile developing is performed by the client, and the method further comprises:
    transmitting the profile to the cloud based security system.

4. The method of claim 1, wherein the selectively performing interception is not performed responsive to the profile indicating an application is a certificate pinned application.

5. The method of claim 1, further comprising:
    for a certificate pinned application, performing one of allowing the connection, blocking the connection, and quarantining the connection through the cloud based security system.

6. A user device configured to operate a context aware tunnel to identify and process certificate pinned applications with a cloud based security system, the user device comprising:
    a network interface;
    a processor communicatively coupled to the network interface; and memory storing instructions for a tunnel that, when executed, cause the processor to:
        passively monitor an application installed on the client and traffic associated with a connection through the tunnel including passively observing handshake messages for establishing a connection to a server, between the client and one of the server and the cloud based security system, wherein tunnel provides communication between the client and the cloud based security system;
        determine, based at least in part on a behavior of the application, a handshake status and a certificate status of the application;
        develop a profile of the application associated with the traffic based on the handshake status and the certificate status of the application, wherein the profile comprises whether or not the application is a certificate pinned application which requires a predefined set of criterion to be matched against an advertised certificate; and
        provide the profile to the cloud based security system for selective interception of the connection in the cloud based security system based on the profile,
        wherein the profile is provided periodically to the cloud based security system on an out-of-band, persistent, control channel.

7. The user device of claim 6, wherein the cloud based security system does not perform the selective interception responsive to the profile indicating an application is a certificate pinned application.

8. The user device of claim 6, wherein the cloud based security system is configured to, for a certificate pinned application, perform one of allow the connection, block the connection, and quarantine the connection.

9. An interception proxy in a cloud based security system configured to identify and process certificate pinned applications, the interception proxy comprising:
    a network interface;
    a processor communicatively coupled to the network interface; and memory storing instructions that, when executed, cause the processor to:
        receive one of (1) a handshake status and a certificate status of an application of a client, and (2) a profile of an application based on the handshake status and the certificate status of the application from a tunnel installed on the client, wherein the tunnel provides communication between the client and the cloud based security system;
        maintain a profile of a plurality of applications including the application, wherein the profile comprises whether or not the application is a certificate pinned application which requires a predefined set of criterion to be matched against an advertised certificate, and wherein the profile is developed based on the handshake status and the certificate status determined based at least in part on a behavior of the application obtained by passively monitoring the application and traffic associated with a connection associated with an application, wherein the passively monitoring is by the tunnel and the traffic is through the tunnel, the passively monitoring including passively observing handshake messages for establishing a connection to a server, between the client and one of the server and the cloud based security system; and selectively perform interception of connections in the cloud based security system based on the associated profile of the associated application, wherein the profile is periodically transfered to the cloud based security system on an out-of-band, persistent, control channel.

10. The interception proxy of claim 9, wherein the profile is developed through the tunnel.

11. The interception proxy of claim 9, wherein the interception proxy is part of the cloud based security system.

12. The interception proxy of claim 9, wherein the selectively interception is not performed responsive to the profile indicating an application is a certificate pinned application.

13. The interception proxy of claim 9, wherein the memory storing instructions that, when executed, further cause the processor to:

for a certificate pinned application, perform one of allow the connection, block the connection, and quarantine the connection through the cloud based security system.

14. The method of claim 1, wherein the tunnel is configured to perform the steps of inspecting packets from the tunnel, mangling the packets, and transmitting the mangled packets between the client and the cloud based security system, wherein the mangling includes swapping source and destination addresses, such that an initial value of the source address is replaced by an initial value of the destination address and the initial value of the destination address is replaced by the initial value of the source address, and replacing a destination port.

15. The user device of claim 6, wherein the memory storing instructions for the tunnel that, when executed, further cause the processor to perform the steps of inspecting packets from the tunnel, mangling the packets, and transmitting the mangled packets between the client and the cloud based security system, wherein the mangling includes swapping source and destination addresses, such that an initial value of the source address is replaced by an initial value of the destination address and the initial value of the destination address is replaced by the initial value of the source address, and replacing a destination port.

* * * * *